(12) United States Patent
Adair et al.

(10) Patent No.: US 7,014,027 B2
(45) Date of Patent: Mar. 21, 2006

(54) FRICTION MATERIAL HAVING OIL LOCALIZATION SLOTS

(75) Inventors: Jeffrey W. Adair, Longview, TX (US);
Jeffrey D. Morris, Longview, TX (US);
Graham Marlborough, Tondu (GB);
Gary I. Skipper, Swansea (GB);
Norman R. Jones, Neath (GB)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/619,083

(22) Filed: Jul. 14, 2003

(65) Prior Publication Data

US 2005/0011720 A1    Jan. 20, 2005

(51) Int. Cl.
  *F16D 13/72* (2006.01)
(52) U.S. Cl. .............................. 192/113.36; 192/107 R
(58) Field of Classification Search ............ 192/107 R, 192/113.36, 70.12; 156/257, 264; 188/264 D
See application file for complete search history.

(56) References Cited

U.S. PATENT DOCUMENTS

| 1,682,198 A | 8/1928 | Sitton |
|---|---|---|
| 1,860,147 A | 5/1932 | Hadley |
| 2,221,893 A | 11/1940 | White |
| 2,307,814 A | 1/1943 | Walters |
| 2,316,874 A | 4/1943 | Kraft |
| 2,354,526 A | 7/1944 | Lapsley et al. |
| 2,516,544 A | 7/1950 | Breeze |
| 2,555,261 A | 5/1951 | Walters |
| 2,702,770 A | 2/1955 | Steck |
| 2,749,264 A | 6/1956 | Emrick |
| 3,080,028 A | 3/1963 | Kennedy |
| 3,429,766 A | 2/1969 | Stormfeltz |
| 3,520,390 A | 7/1970 | Bentz |
| 3,526,306 A | 9/1970 | Bentz et al. |
| 3,578,122 A | 5/1971 | Magnier |
| 3,654,777 A | 4/1972 | Grundman |
| 3,871,934 A | 3/1975 | Marin |
| 3,927,241 A | 12/1975 | Augustin |
| 4,002,225 A | 1/1977 | Marin |
| 4,033,437 A | 7/1977 | Labat |
| 4,045,608 A | 8/1977 | Todd |
| 4,209,086 A | 6/1980 | Friedrich |
| 4,260,047 A | 4/1981 | Nels |
| 4,267,912 A | 5/1981 | Bauer et al. |
| 4,291,794 A | 9/1981 | Bauer |
| 4,396,100 A | 8/1983 | Eltze |
| 4,639,392 A | 1/1987 | Nels et al. |
| 4,674,616 A | 6/1987 | Mannino, Jr. |

(Continued)

FOREIGN PATENT DOCUMENTS

EP    0 393 845 A1    10/1990

(Continued)

OTHER PUBLICATIONS

European Search Report—EP 04 25 3746—May 3, 2005.

*Primary Examiner*—Rodney H. Bonck
(74) *Attorney, Agent, or Firm*—Emch, Schaffer, Schaub & Porcello, Co., L.P.A.

(57) ABSTRACT

A friction material has a plurality of connected sections and a plurality of oil localization slots. Each connected section is defined by adjacent oil localization slots in the friction material. The oil localization slot has opposing sides that define a reservoir which retains fluid in the oil localization slot when the friction material is formed into a desired shape on an end use product.

22 Claims, 2 Drawing Sheets

U.S. PATENT DOCUMENTS

| | | |
|---|---|---|
| 4,698,889 A | 10/1987 | Patzer et al. |
| 4,700,823 A | 10/1987 | Winckler |
| 4,726,455 A | 2/1988 | East |
| 4,732,247 A | 3/1988 | Frost |
| 4,742,723 A | 5/1988 | Lanzerath et al. |
| 4,770,283 A | 9/1988 | Putz et al. |
| 4,878,282 A | 11/1989 | Bauer |
| 4,913,267 A | 4/1990 | Campbell et al. |
| 4,917,743 A | 4/1990 | Gramberger et al. |
| 4,950,530 A | 8/1990 | Shibatani |
| 4,951,798 A | 8/1990 | Knoess |
| 4,986,397 A | 1/1991 | Vierk |
| 4,995,500 A | 2/1991 | Payvar |
| 4,997,067 A | 3/1991 | Watts |
| 5,038,628 A | 8/1991 | Kayama |
| 5,076,882 A | 12/1991 | Oyanagi et al. |
| 5,094,331 A | 3/1992 | Fujimoto et al. |
| 5,101,953 A | 4/1992 | Payvar |
| 5,105,522 A | 4/1992 | Gramberger et al. |
| 5,143,192 A | 9/1992 | Vojacek et al. |
| 5,211,068 A | 5/1993 | Spitale et al. |
| 5,221,401 A | 6/1993 | Genise |
| 5,269,400 A | 12/1993 | Fogelberg |
| 5,313,793 A | 5/1994 | Kirkwood et al. |
| 5,332,075 A | 7/1994 | Quigley et al. |
| 5,335,765 A | 8/1994 | Takakura et al. |
| 5,460,255 A | 10/1995 | Quigley |
| 5,571,372 A | 11/1996 | Miyaishi et al. |
| 5,615,758 A | 4/1997 | Nels |
| 5,620,075 A | 4/1997 | Larsen et al. |
| 5,662,993 A | 9/1997 | Winckler |
| 5,671,835 A | 9/1997 | Tanaka et al. |
| 5,771,691 A | 6/1998 | Kirkwood et al. |
| 5,776,288 A | 7/1998 | Stefanutti et al. |
| 5,842,551 A | 12/1998 | Nels |
| 5,845,754 A | 12/1998 | Weilant |
| 5,897,737 A | 4/1999 | Quigley |
| 6,000,510 A | 12/1999 | Kirkwood et al. |
| 6,019,205 A | 2/2000 | Willwerth et al. |
| 6,062,367 A * | 5/2000 | Hirayanagi et al. ..... 192/107 R |
| 6,065,579 A | 5/2000 | Nels |
| 6,203,649 B1 * | 3/2001 | Kremsmair et al. ... 192/113.36 |
| 2003/0047411 A1 * | 3/2003 | Collis et al. ............ 192/107 R |

FOREIGN PATENT DOCUMENTS

| | | |
|---|---|---|
| EP | 0 510 875 A2 | 10/1992 |
| WO | WO96/10701 | 4/1996 |
| WO | WO99/35415 | 7/1999 |

* cited by examiner

FRICTION MATERIAL HAVING OIL LOCALIZATION SLOTS

TECHNICAL FIELD

The present invention relates generally to a friction material. More specifically, the invention is directed to a friction material having a plurality of oil localization slots. The friction material are useful with power transmission-energy absorption assemblies such as clutches, brakes, automatic transmissions, limited slip differentials, hoists, synchronizers, circular bands, discs, and the like end use products.

BACKGROUND OF THE PRESENT INVENTION

A friction material is usually composed of sintered metal or fiber mat which normally is impregnated with a phenolic resin. The friction material is commonly cut from a continuous strip of rectangular sheeting composed of the friction material which is fed through the die or cutting apparatus. The friction material may be relatively expensive and, therefore, it is desirable to optimize the elimination of waste from the manufacturing process.

Further, elimination of waste product from the manufacture process assists in meeting compliance standards. The proper disposal of any scrap is the focus of increasing regulation by current environmental regulators. Any scrap resulting from the cutting process must be disposed of in an appropriate manner and, because of the materials from which the friction facing is manufactured, this disposal is becoming increasingly costly.

Further, in the interest of optimizing the useful life of the product to which the friction material is applied, operational smoothness, and cooling efficiency for the end use product, the literature and art relating to friction material provides numerous designs producing a large variety of friction facing materials and designs of friction facing materials. A common friction facing, currently available is shown by the disclosure of U.S. Pat. Nos. 4,260,047 and 4,674,616 which disclose friction discs, for use with clutches, which are formed from friction material and produced from the joining of a plurality of separate arcuate segments. The arcuate segments are pre-grooved to allow cooling oil to flow across the friction facing during clutch operation.

U.S. Pat. Nos. 5,094,331, 5,460,255, 5,571,372, 5,776,288, 5,897,737 and 6,019,205 disclose clutch friction plates having a large number of friction material segments on the plate. The segments are spaced such that an oil groove is provided between every adjacent segment.

U.S. Pat. Nos. 3,871,934 and 4,002,225 show a friction material wound around the outer periphery disc, such that it overlaps the disc on both sides. The overlap is then cut at intervals around the periphery and folded onto the surface of the disc.

U.S. Pat. No. 5,335,765, discloses a friction member having sets of first grooves and second grooves disposed in a radial plane and inclined obliquely backwardly in relation to the direction of rotation.

U.S. Pat. Nos. 5,615,758 and 5,998,311 show friction yarn facing materials with no grooves, but rather, the warp and fill yarns form channels to allow for the flow of fluid therethrough.

The manufacturing of each of these friction materials produces a large amount of unused or scrap material. It is, therefore, one object of the invention to effectively reduce the amount of scrap remaining after cutting of the friction material.

It is also desired that the sufficient cooling and lubrication of the friction material occur such that smooth engagement and disengagement of the end use product is maintained without creating excessive wear on the end use product and the friction material. Many prior art friction material designs incorporate the use of grooves or slot patterns within the facing material to achieve the desired cooling and lubrication by allowing the passage of a fluid such as oil through the friction facings. Such cooling grooves are generally produced from one of three labor-intensive methods. One method provides that the friction material is pre-grooved prior to being cut and applied to the clutch plate in a manner such as that shown by U.S. Pat. No. 4,260,047. Another method of producing grooves utilizes configured tooling to compress portions of the friction material during the bonding process. The third method involves producing cut grooves in a finished friction plate by mounting the plate onto a fixture and passing multiple milling and grinding wheels through the friction material to cut distinct grooves of desired depth and definition.

The common failing of the previous designs of friction materials lies in the formation of intricate shapes and designs which consequently leads to manufacturing complexities, increased scrap production and the resultant concerns regarding proper disposal of the scrap. Further, the previous friction materials are all individually manufactured to specific types of friction clutches and, generally speaking, cannot be used in a wide variety of applications.

It is an object of the present invention to manufacture a friction material having distinct cooling groove patterns of desired depth and definition without the need for secondary operations and attendant machinery.

It is yet another object of the present invention to provide a friction material having a plurality of desired grooves therein.

Yet another object of the invention is to provide friction material having structural advantages designated to produce enhanced production performance, and specifically durability, thermal stability, and compression set.

Yet a further object of the invention is to produce a friction material having the capability of maintaining static pressure and holding dynamic fluid flow within the grooves of the friction material during operation of the end use product.

It is another object of the invention to provide a friction material which is universally applicable to differing types of end use products. The friction material are especially useful with power transmission-energy absorption assemblies such as clutches, brakes, automatic transmissions, limited slip differentials, hoists, synchronizers, circular bands, discs, and the like end use products.

DISCLOSURE OF THE PRESENT INVENTION

A friction material has a plurality of oil localization slots and, in certain embodiments, is a unitary, or continuous strip of material. The friction material is oriented on the end use product so as to create desired lubrication and pumping functions through oil localization slots created in the friction material. The orientation of the oil localization slots in the friction material achieves a desired direction of oil flow radially into or out of the end use product and also creates a desired amount of hydrostatic pressure. The size of the friction material and the shape, spacing and orientation of the oil localization slots all operate to control the degree of fluid pumping, the hydrostatic pressure, and the amount of cooling of the end use product.

In one aspect, the present invention describes a friction material which is blanked with a desired number of oil localization slots as a straight strip of material and then is wound circumferentially to cover a face of the an end use product such as a synchronizer.

In another aspect, the present invention describes a friction material which is blanked with a desired number of oil localization slots as a straight strip of material and then is at least partially placed over the desired sections of the end use product.

In one preferred aspect, the oil localization slots have a generally "tear drop"-shape where each oil localization slots has an apex which is rounded and has an opening that is narrower than the width of the oil localization slot at its widest. In a preferred aspect, the apex has a generally circular shape which allows the oil to be held in the slot. The unique geometry of the tear-drop slot and its apex promotes both desirable retention and wiping, or clearing, of the oil from the friction surface interface during use.

In another preferred aspect, the oil localization slots have a generally "dovetail", or triangular-shape where each oil localization slots has an apex which is generally flat and has an opening that is narrower than the width of the oil localization slot at its widest. In a preferred aspect, the apex has a generally flat shape which allows the oil to be held in the slot. The unique geometry of the dovetail, or triangular, slot and its apex promotes both desirable retention and wiping, or clearing, of the oil from the friction surface interface during use.

The oil localization slots define wiping edges that are used for clearing the oil from the friction surface during use. This allows the friction material and the mating component to generate a frictional contact and resulting torque between the two components. This frictional surface is the interface of contact side of the friction material and the mating component. For example, in certain synchronizer embodiments, the mating component is either the gear cone or connecting components of a multi cone synchronizer.

In certain embodiments, the oil localization slots are "full depth" such that there is no fluid flow from one end of the slot to the other end of the slot.

One criterion in determining the shape, spacing and orientation of the oil localization slots in the friction material of this invention is the ratio of the circumference (360) to the desired number of grooves in the length of friction material to be placed on the end use product. That is, 360 number of grooves=radial angle of each oil localization slot.

As the performance requirements for end use products becomes more stringent, the end use products must be able to provide high torque at high surface speeds thereby operating efficiently at high temperatures. This performance requirement therefore demands more expensive, higher performance materials for use as the friction material. Thus, as the material costs increase, the present invention provides for an efficient method to produce a friction material which minimizes the friction surface area while simultaneously striving to maintain cooling and lubrication requirements. The oil localization slotted friction material allows for greater heat dissipation within the end use product which is necessary to meet the desired performance standards.

In the method of making the end use product of the present invention, a strip of friction material is blanked out, or notched, with the desired geometry defining each oil localization slot. The blanked out strip of friction material is cut to a desired length.

Thereafter, the friction material is adhered to the end use product in a desired manner. One method for adhering the oil localization slotted friction material to the end use product involves using a thermosetting adhesive coated on the end use product. Thereafter, the friction material and end use product are heated in a suitable manner.

The various embodiments of the present invention will be more readily understood, in their application to the objectives of this invention by reference to the accompanying drawings and the following description of the preferred embodiments of the invention.

DETAILED DESCRIPTION OF PREFERRED EMBODIMENTS

An end use product is schematically shown in the figures herein as 8. In embodiments where the end use product is a synchronizer, the product 8 generally has a frustoconical member 9 having an outer surface.

In particular, the present invention relates to a friction material which is preferably adhered to the outer surface of the end use product. The friction material has a plurality of connected sections and a plurality of oil localization slots where each connected section is defined by adjacent slots in the friction material. Each slot has opposing sides that define a reservoir which retains fluid in the oil localization slot when the friction material is formed into a circular shape.

The unique oil localization slotted geometry of the friction material of the present invention provide a resulting oil groove having a desired width and an oil reservoir, as will be described in detail below. In certain preferred embodiments, the friction material contains from about 12 to about 20 and preferably about 15 slots in a desired length of friction material. In other embodiments, the number of slots depends upon the desired configuration of the end use product and operating conditions under which that product will be used.

Figure 1:
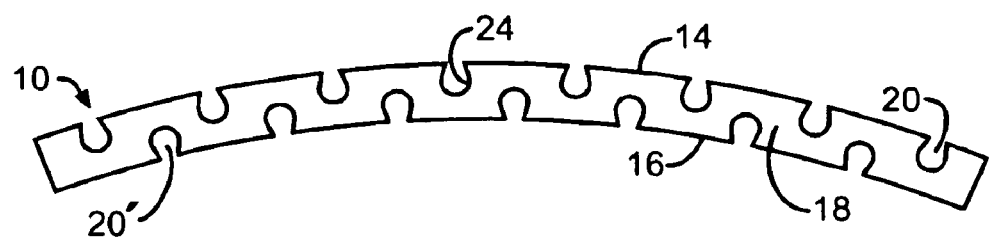
FIG. 1 is a top schematic plan view of a strip of an oil localization slotted friction material disposed in an arcuate shape where the slots have a tear-drop shape.
Figure 3:
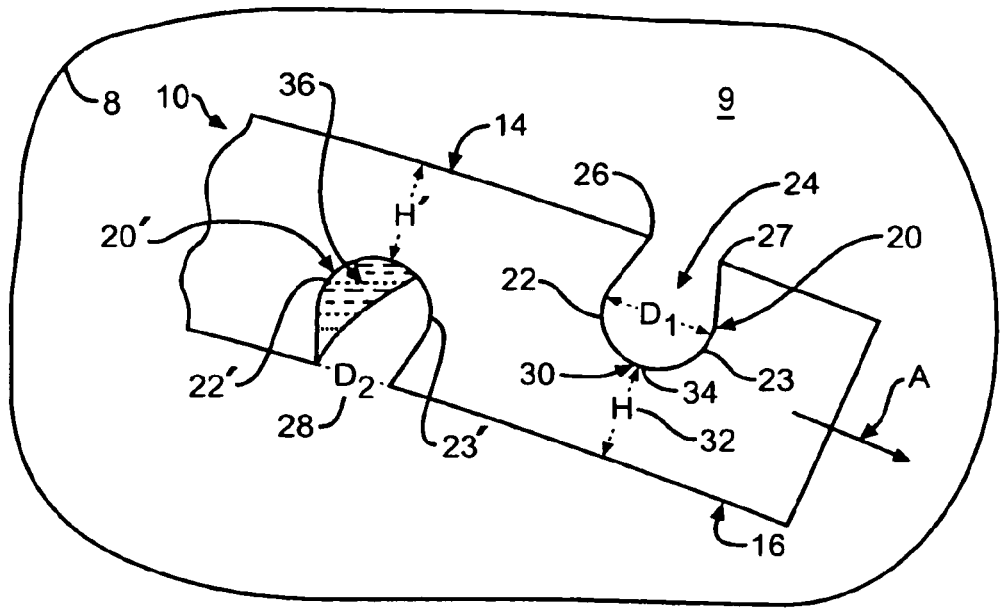
FIG. 3 is a schematic view of oil localization slots in the friction material of FIG. 1 on a schematic illustration of an end use product such as a synchronizer.

Referring now to FIGS. 1 and 3, one embodiment of a friction material 10 of the present invention is shown. The friction material 10 is produced from a continuous strip of a suitable friction material such as a sintered metal or fiber mat impregnated with a resin as described above. The friction material 10 has a shape which is die cut so as to use nearly all of the available friction material during the blanking or cutting process.

The friction material 10 has an outer edge 14, an inner edge 16, and a plurality of connected sections 18 which are defined by a desired number of oil localization slots 20. As can readily be seen by referring to the figures and for ease of discussion herein, the reference numerals 20 and 120 will be generally used to describe features common to the inner slots 20' and 120' and the outer slots, 20 and 120. The friction material 10 thus comprises a plurality of attached sections 18 separated by individual slots 20. In the embodiment shown, the friction material 10 has alternating slots 20' and 20, which alternately radiate from the inner edge 16 in a direction toward the outer edge 14 or radiate from the outer edge 14 in a direction toward the inner edge 16, respectively.

FIGS. 1 and 3 show one preferred embodiment where each slot 20 has a generally tear-drop shape such that the a first side 22 and a second side 23 of the slot 20 each has substantially the same curved, or arcuate shape; that is, the sides 22 and 23 of each slot 20 extend at the same, yet opposing, angle from the inner edge 16 toward the outer edge 14.

The desired number of slots 20 in a friction material 10 is determined by the end use application and can be is determined by dividing the 360 by the amount of space between adjacent slots to give the number of oil localization slots desired. For example, in the embodiment shown in the figures herein, 360÷24=15 oil localization slots.

The sides 22 and 23 of the slot 20 define a groove, or gap, 24. When the friction material 10 is in a circular shape on the end use product 8, the groove 24 has a width that varies along the length of the sides. In the embodiment shown in FIGS. 1 and 3, the width of the groove 24 is at its widest point at a midpoint along the sides 22 and 23. The length of the widest point of the groove 24 is defined by a first distance (D1). Thus, the distance D1 is measured at the groove's widest point. The sides 22 and 23 of the slot 20 each terminate at opposing ends 26 and 27, respectively. The ends 26 and 27 define an opening 28 having a width that is defined by a second distance D2. The second distance D2 is shorter than the first distance D1.

The oil localization slot 20 terminates at an apex 30. In the embodiment shown in FIGS. 1 and 3, the apex 30 has a substantially rounded, or circular, shape. In other embodiments, however, it should be understood that other shapes such as oval, elliptical and the like are also useful and, as such, are within the contemplated scope of the present invention.

The apex 30 has a distal end 34 which terminates at a preferred distance (H) from either outer edge 14 or the inner edge 16, depending on which slot is being examined. The distance H defines a bridge section 32 of the friction material 10. The bridge section 32 extends between the distal end 34 of the apex 30 and either the outer edge 14 or the inner edge 16. In the embodiment shown, the distance H of one slot 20 extends beyond an adjacent distance H' on an adjacent slot 20'.

The bridge section 32 preferably has the above described desired geometry since, if the bridge section 32 is too large, the friction material tears inconsistently, and, if the bridge section 32 is too small, the friction material is too weak. The shape of the apex 30 allows for controlled and consistent forming of the friction material 10.

The sides 22 and 23 of the slot 20 are configured to create a desired fluid flow pattern in the groove 24 when the friction material 10 is circumferentially adhered to the end use product 8. The sides 22 and 23 and the apex 30 of the radially extending grooves 24 create a fluid reservoir 36 which provides a desired hydrostatic pressure as fluid flows into the groove 24 and terminates in the apex 30. This oil reservoir 36 in the groove 24 and apex 30 assists in operating the end use product 8.

In each of these embodiments, the pressure created in the reservoir 36 in the groove 24 between the sides 22 and 23 of the oil localization slot 20 provides an appropriate pumping action to press fluid into the groove 24, thereby creating a pressure head in the groove 24 and in the apex 30.

The length of the distances D1 and D2 are determined by calculating the desired amount of cooling fluid flow desired and the amount of pressure build-up desired. The friction material 10 of the present invention is easily adaptable to pumping oil radially in or radially out of the reservoir 36 depending on the orientation of the oil localization slots. The friction material produces a pressure build up in the oil localization slots 20. The friction material is universally applicable to any desired objective, depending on its relative orientation and the direction of rotation of the end use product.

The oil localization slots have a desired specific shape in order to direct the flow of oil into the oil reservoir 36. The oil is then partially held in the reservoir 36 and prevented from flowing back out and away from the friction surface by the retention side of the slot. This retention side is determined by the direction of rotation of the end use product; that is, in the FIG. 3, the direction of rotation is generally shown by the arrow A. The retention side of the slot 20 is the leading edge of the slot 20, and a wiping, or clearing, edge is the trailing edge of the slot 20. Thus, in the slot 20', the retention edge is 23' and the wiping, or clearing, edge is 22'. It is to be understood that, in certain embodiments, the retention and wiping edges are determined by the direction of rotation of the end use product. The wiping edges of the slots 20 are used for clearing the oil from the friction surface during use. For example, when the friction material is used with a synchronizer, this allows the friction material and mating component to generate a frictional contact and resulting torque between the two mating components, which can be either the gear cone of connection components of a multi cone synchronizer.

It is thus desired that the opening 28 be narrower than the width of the slot 20 so that the reservoir 36 is formed. The small amount of oil maintained at the friction surface assists in cooling the interface temperature during the use of the product. The edges 26 and 27 are spaced apart, thus allowing the slot 20 to be opened at the opening 28, whereby the oil can also migrate into the friction material itself if the friction material is made of a porous material. This migration of oil into the friction material itself also assists in reducing the operation temperatures of the end use product.

Figure 2:
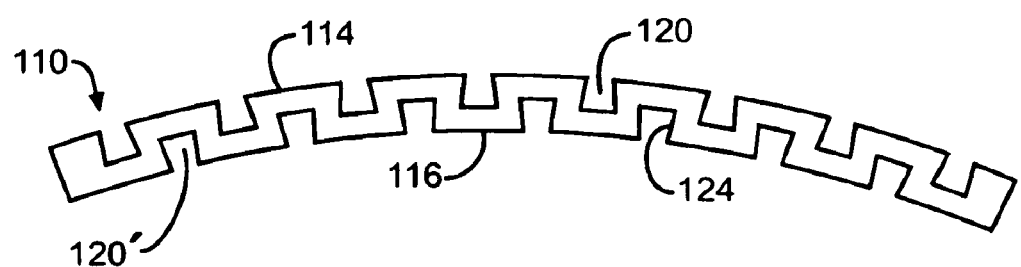
FIG. 2 is a top schematic plan view of a strip of an oil localization slotted friction material disposed in an arcuate shape where the slots have a dovetail shape.
Figure 4:
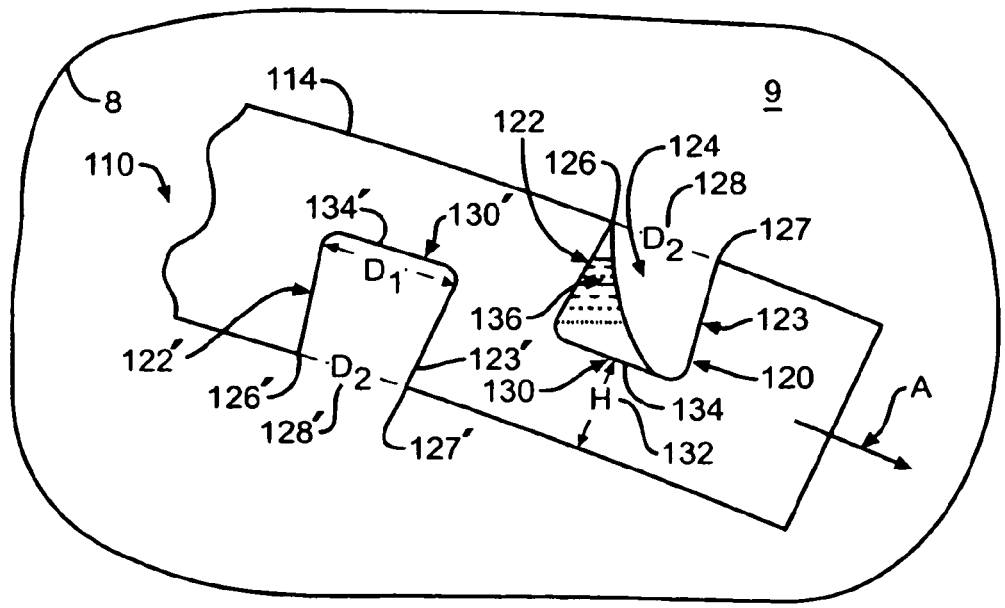
FIG. 4 is a schematic view of oil localization slots in the friction material of FIG. 2 on a schematic illustration of an end use product such as a synchronizer.

Referring now to FIGS. 2 and 4, another embodiment of a friction material 110 of the present invention is shown. The friction material 110 is produced from a continuous strip of a suitable friction material such as a sintered metal or fiber mat impregnated with a resin as described above. The friction material 110 has a shape which is die cut so as to use nearly all of the available friction material during the blanking or cutting process.

The friction material 110 has an outer edge 114, an inner edge 116, and a plurality of connected sections 118 which are defined by a desired number of oil localization slots 120. The friction material 110 thus comprises a plurality of attached sections 118 separated by individual slots 120. In the embodiment shown, the friction material 110 has alternating slots 120' and 120, which alternately radiate from the inner edge 116 in a direction toward the outer edge 114 or radiate from the outer edge 114 in a direction toward the inner edge 116, respectively.

FIGS. 2 and 4 show one preferred embodiment where each slot 120 has a generally triangular, or dovetail, shape such that the a first side 122 and a second side 123 of the slot 120 each extends at substantially the same angle from a line defined by the inner edge 116; that is, the sides 122 and 123 of each slot 120 extend at the same, yet opposing, angle from the inner edge 116 toward the outer edge 114.

The desired number of slots 120 in a friction material 110 is determined by the end use application and can be is determined by dividing the 360 by the amount of space between adjacent slots to give the number of oil localization slots desired. For example, 360÷24=15 oil localization slots.

The sides 122 and 123 of the slot 120 define a groove, or gap, 124. When the friction material 110 is in a circular shape on the end use product, the groove 124 has a width that varies along the length of the sides. In the embodiment shown in FIGS. 2 and 4, the width of the groove 124 is at its widest point at an end or distal point of the sides 122 and 123. The length of the widest point of the groove 124 is defined by a first distance (D1). Thus, the distance D1 is measured at the groove's widest point. The sides 122 and 123 of the slot 120 each terminate at opposing ends 126 and 127, respectively. The ends 126 and 127 define an opening 128 having a width that is defined by a second distance D2. The second distance D2 is shorter than the first distance D1.

The oil localization slot 120 terminates at an apex 130. In the embodiment shown in FIGS. 2 and 4, the apex 130 has a substantially flat shape such that the sides 126 and 127 and the apex 130 from a dovetail, or triangular shape. In other embodiments, however, it should be understood that other shapes such as pentagons and the like are also useful and, as such, are within the contemplated scope of the present invention.

The apex 130 has a distal end 134 which terminates at a preferred distance (H) from the either outer edge 114 or the inner edge 116, depending on which slot is being examined. The distance H defines a bridge section 132 of the friction material 110. The bridge section 132 extends between the distal end 134 of the apex 130 and either the outer edge 114 or the inner edge 116. In the embodiment shown, the distance H of one slot 120 extends beyond an adjacent distance H' on an adjacent slot 120'.

The bridge section 132 preferably has the above described desired geometry since, if the bridge section 132 is too large, the friction material tears inconsistently, and, if the bridge section 132 is too small, the friction material is too weak. The shape of the apex 130 allows for controlled and consistent forming of the friction material 110.

The sides 122 and 123 of the slot 120 are configured to create a desired fluid flow pattern in the groove 124 when the friction material 110 is adhered to the end use product. The sides 122 and 123 and the apex 130 of the radially extending grooves 124 create a fluid reservoir 136 which provides a desired hydrostatic pressure as fluid flows into the groove 124 and terminates in the apex 130. This oil reservoir 136 in the groove 124 and apex 130 assists in operating the end use product.

In each of these embodiments, the pressure created in the reservoir 136 in the groove 124 between the sides 122 and 123 of the oil localization slot 120 provides an appropriate pumping action to press fluid into the groove 124, thereby creating a pressure head in the groove 124 and in the apex 130.

The length of the distances D1 and D2 are determined by calculating the desired amount of cooling fluid flow desired and the amount of pressure build-up desired. The friction material 110 of the present invention is easily adaptable to pumping oil radially in or radially out of the reservoir 136 depending on the orientation of the oil localization slots. The friction material produces a large pressure build up in the oil localization slots 120. The friction material is universally applicable to any desired objective, depending on its relative orientation and the direction of rotation of the end use product.

The oil localization slots have a desired specific shape in order to direct the flow of oil into the oil reservoir 136. The oil is then partially held in the reservoir 36 and prevented from flowing back out and away from the friction surface by the retention side of the slot. This retention side is determined by the direction of rotation of the end use product; that is, in the FIG. 2, the direction of rotation is generally shown by the arrow A. The retention side of the slot 120 is the leading edge of the slot 120, and a wiping, or clearing, edge is the trailing edge of the slot 120. Thus, in the slot 120, the retention edge is 123 and the wiping, or clearing, edge is 122. It is to be understood that the retention and wiping edges are determined by the direction of rotation of the end use product within the transmission. The wiping edges of the slots 120 are used for clearing the oil from the friction surface during use. This allows the friction material and mating component to generate a frictional contact and resulting torque between the two mating components, which, in the example of a synchronizer, can be either the gear cone of connection components of a multi cone synchronizer.

It is thus desired that the opening 128 be narrower than the width of the slot 120 so that the reservoir 136 is formed. The small amount of oil maintained at the friction surface assists in cooling the interface temperature during use. Since the edges 126 and 127 are in a spaced apart relationship, thus allowing the slot 20 to be opened at the opening 128, the oil can also migrate into the friction material if friction material is made of a porous material. This migration of oil into the friction material itself also assists in reducing the operation temperatures of the end use product.

It is also within the scope of the present invention that the friction material can have at least one of the oil localization slots which defines a first radially extending side which extends at a first angle from a first edge of the friction material and further defines a second, opposing radially extending side which extends at a second angle from the first edge of the friction material.

In certain preferred embodiments, the slots 20 and 120 are cut through the full thickness of the friction material. This full cut generates a large cross sectional are of the wiping surface. The cross sectional area is considerably larger than that of conventional post bonding grooving operations that are either cut or pressed into the friction material. In these latter two cases, the grooving is around 35–40% of the final friction material thickness such that the actual "wiping area" is considerably less than it would be if it were through the full thickness of the friction material. In the present invention, the actual wiping areas of the grooves 24 are now considerably larger than that of convention grooving in the conventional friction materials.

Another benefit is that, with the present invention, there is no longer a requirement for the same number of grooves for a given diameter of friction area. When fewer grooves are required, there is a greater effective friction surface area maintained.

Yet another benefit is that, for the same operating parameters, the specific loading or energies on the friction material during use are lowered which, in turn, improves the thermal stability, compression set, and durability of the friction material. Further, when comparing the friction material of the present invention with a convention friction material having the same diameter, the friction material of the present invention has increased operating parameters.

The oil localization slotted friction material can be manufactured consistently using the blanking, assembly and bonding methods as generally known, and thus need not be described herein. The manufacturing process can be performed separately in batches or can be integrated into a fully automated process. An automated process results in further significant cost reductions due to the efficient use of friction material, and also due to the low cost of the machine assembly as compared to a labor-intensive manual process.

Yet another advantage of the present invention is that the full depth, dead end oil grooves created by the slots blanked into the strip of friction material eliminate the need for separate (and expensive) mill grooving or molding operations.

The above descriptions of the preferred and alternative embodiments of the present invention are intended to be illustrative and are not intended to be limiting upon the scope and content of the following claims.

We claim:

1. A friction material comprising a plurality of connected sections having an inner edge and an outer edge, and first and second sets of oil localization slots, being positioned in the friction material, the first set of oil localization slots radiating from the inner edge of the friction material and the second set of oil localization slots radiating from the outer edge of the friction material, each oil localization slot having opposing sides that defines a reservoir which retains fluid in the oil localization slot when the friction material is formed into a circular shape, each oil localization slot defining an opening at the edge of the friction material, the opposing sides diverge from the opening to define the reservoir; each oil localization slot having a width that varies along the length of the sides of the oil localization slot wherein, the width of the oil localization slot is wider than the opening for the oil localization slot.

2. The friction material of claim 1, wherein the oil localization slot has a retention side and a wiping side for retaining the fluid in the friction material.

3. The friction material of claim 2, wherein the oil localization slots have a width that varies along the length of the sides of the slots and at the midpoint of the sides is determined by a first distance D1 from opposing sides of the oil localization slot.

4. The friction material of claim 3, wherein the oil localization slots each terminate at an opening having a width that is defined by a second distance D2, wherein the second distance D2 is shorter than the first distance D1.

5. The friction material of claim 1, at least one oil localization slot has a substantially tear drop shape.

6. The friction material of claim 1, wherein at least one oil localization slot has a substantially dovetail shape.

7. The friction material of claim 1, wherein the oil localization slots defines a first radially extending side which extends at a first angle from a first edge of the friction material and further defines a second, opposing radially extending side which extends at a second angle from the first edge of the friction material.

8. The friction material of claim 1, wherein the oil localization slot defines a closed end groove on the friction material.

9. The friction material of claim 1, wherein each oil localization slot terminates at an apex the apex having a distal end which terminates at a preferred distance (H) from either the outer edge or the inner edge of the friction material, depending on which slot is being examined, wherein the distance H defines a bridge section of the friction material; the bridge section extending between the distal end of the apex and either the outer edge or the inner edge.

10. The friction material of claim 9, wherein the distance H of one slot measured from the outer edge of the friction material, extends beyond an adjacent distance H' on an adjacent slot measured from the inner edge of the friction material.

11. The friction material of claim 9, wherein the apex has at least one of a substantially rounded, circular, oval, or elliptical shape.

12. An end use product for use with cooling fluid comprising:

a friction member having an outer surface;

a friction material adhered to the outer surface; the friction material comprising a plurality of connected sections and first and second sets of oil localization slots, being positioned in the friction material, the first set of oil localization slots radiating from an inner edge of the friction material and the second set of oil localization slots radiating from an outer edge of the friction material, each oil localization slot having opposing sides that define a reservoir which retains fluid in the oil localization slot when the friction material is formed into a desired shape, each oil localization slot defining an opening at the inner or outer edge of the friction material, the opposing sides diverge from the opening to define the reservoir, each oil localization slot having a width that varies along the length of the sides of the oil localization slot, the width of the oil localization slot is wider than the opening for the oil localization slot.

13. The end use product of claim 12, wherein the oil localization slot have a retention side and a wiping side for retaining the fluid in the friction material.

14. The end use product of claim 13, wherein at least one oil localization slot has a substantially tear drop shape.

15. The end use product of claim 12, wherein at least one oil localization slot has a substantially dovetail shape.

16. The end use product of claim 12, wherein the friction material has about 12 to about 16 oil localization slots.

17. The end use product of claim 12, wherein each oil localization slot defines a first radially extending side which extends at a first angle from a first edge of the friction material and further defines a second, opposing radially extending side which extends at a second angle from the first edge of the friction material.

18. The end use product of claim 12, wherein the oil localization slots have a width that varies along the length of the sides of the slots and at the midpoint of the sides is determined by a first distance D1 from opposing sides of the oil localization slot.

19. The end use product of claim 18, wherein the oil localization slots each terminate at an opening having a width that is defined by a second distance D2, wherein the second distance D2 is shorter than the first distance D1.

20. The end use product of claim 18, wherein the end use product comprises at least one of a power transmission-energy absorption assembly including clutches, brakes, automatic transmissions, limited slip differentials, hoists, synchronizers, circular bands, discs, clutches, and the like end use products.

21. The end use product of claim 12, wherein at least one oil localization slot defines a closed end groove on the friction material.

22. The end use product of claim 12, comprising at least one of a power transmission-energy absorption assembly including clutches, brakes, automatic transmissions, limited slip differentials, hoists, synchronizers, circular bands, discs, clutches, and the like end use products.

* * * * *